United States Patent
Xiao et al.

(10) Patent No.: US 10,074,387 B1
(45) Date of Patent: Sep. 11, 2018

(54) METHOD AND SYSTEM FOR PROVIDING A READ TRANSDUCER HAVING SYMMETRIC ANTIFERROMAGNETICALLY COUPLED SHIELDS

(71) Applicant: Western Digital (Fremont), LLC, Fremont, CA (US)

(72) Inventors: Rongfu Xiao, Dublin, CA (US); Miaoyin Wang, Fremont, CA (US); Zhihong Zhang, Fremont, CA (US); Guanghong Luo, Fremont, CA (US); Ming Mao, Dublin, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 658 days.

(21) Appl. No.: 14/578,450

(22) Filed: Dec. 21, 2014

(51) Int. Cl.
*G11B 5/39* (2006.01)

(52) U.S. Cl.
CPC .................. *G11B 5/3912* (2013.01)

(58) Field of Classification Search
CPC .................................................. G11B 5/3912
See application file for complete search history.

(56) References Cited

U.S. PATENT DOCUMENTS

| | | | |
|---|---|---|---|
| 4,873,599 A | 10/1989 | Sueoka | |
| 5,621,592 A | 4/1997 | Gill et al. | |
| 5,750,275 A | 5/1998 | Katz et al. | |
| 5,804,250 A | 9/1998 | Yang | |
| 5,838,521 A * | 11/1998 | Ravipati | G11B 5/3903 |
| | | | 360/319 |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |

(Continued)

FOREIGN PATENT DOCUMENTS

JP 2002298314 10/2002

OTHER PUBLICATIONS

Feng Liu, et al., U.S. Appl. No. 13/894,281, filed May 14, 2013, 30 pages.

(Continued)

*Primary Examiner* — Livius R Cazan
(74) *Attorney, Agent, or Firm* — Foley & Lardner LLP

(57) ABSTRACT

A method provides a magnetic transducer including a first antiferromagnetically coupled (AFC) shield, a second AFC shield and a read sensor between the first and second AFC shields. The first AFC shield includes first and second ferromagnetic layers and a first nonmagnetic spacer layer between the first and second ferromagnetic layers. The first and second ferromagnetic layers have first and second saturation magnetizations and first and second thicknesses, respectively. The second ferromagnetic layer is between the read sensor and the first ferromagnetic layer. The second AFC shield includes third and fourth ferromagnetic layers and a second nonmagnetic spacer layer between the third and fourth ferromagnetic layers. The third ferromagnetic layer is between the read sensor and the fourth ferromagnetic layer. The third and fourth ferromagnetic layers have third and saturation magnetizations and third and fourth thicknesses, respectively. The second AFC shield is a mirror image of the first AFC shield.

15 Claims, 8 Drawing Sheets

(56) References Cited

U.S. PATENT DOCUMENTS

| | | | |
|---|---|---|---|
| 6,032,353 A | 3/2000 | Hiner et al. |
| 6,033,491 A | 3/2000 | Lin |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,087,027 A | 7/2000 | Hoshiya et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi |
| 6,129,957 A | 10/2000 | Xiao et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,256,178 B1 | 7/2001 | Gill |
| 6,258,468 B1 | 7/2001 | Mahvan et al. |
| 6,259,583 B1 | 7/2001 | Fontana, Jr. et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,292,334 B1 | 9/2001 | Koike et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,315,839 B1 | 11/2001 | Pinarbasi et al. |
| 6,317,290 B1 | 11/2001 | Wang et al. |
| 6,317,297 B1 | 11/2001 | Tong et al. |
| 6,322,640 B1 | 11/2001 | Xiao et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,358,635 B1 | 3/2002 | Min et al. |
| 6,359,779 B1 | 3/2002 | Frank, Jr. et al. |
| 6,369,983 B1 | 4/2002 | Hong |
| 6,373,667 B1 | 4/2002 | Han et al. |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,413,325 B1 | 7/2002 | Shimazawa et al. |
| 6,414,826 B1 | 7/2002 | Gill |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,015 B2 | 8/2002 | Ju et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,437,949 B1 | 8/2002 | Macken et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,385 B1 | 9/2002 | Shimazawa et al. |
| 6,452,742 B1 | 9/2002 | Crue et al. |
| 6,452,765 B1 | 9/2002 | Mahvan et al. |
| 6,456,465 B1 | 9/2002 | Louis et al. |
| 6,456,467 B1 | 9/2002 | Mao et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,478,884 B2 | 11/2002 | Shimazawa et al. |
| 6,479,096 B1 | 11/2002 | Shi et al. |
| 6,482,657 B2 | 11/2002 | Shimazawa |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |

(56) References Cited

U.S. PATENT DOCUMENTS

| | | | |
|---|---|---|---|
| 6,496,335 | B2 | 12/2002 | Gill |
| 6,504,676 | B1 | 1/2003 | Hiner et al. |
| 6,512,657 | B2 | 1/2003 | Heist et al. |
| 6,512,659 | B1 | 1/2003 | Hawwa et al. |
| 6,512,661 | B1 | 1/2003 | Louis |
| 6,512,690 | B1 | 1/2003 | Qi et al. |
| 6,515,573 | B1 | 2/2003 | Dong et al. |
| 6,515,791 | B1 | 2/2003 | Hawwa et al. |
| 6,525,911 | B1 | 2/2003 | Gill |
| 6,532,823 | B1 | 3/2003 | Knapp et al. |
| 6,535,363 | B1 | 3/2003 | Hosomi et al. |
| 6,552,874 | B1 | 4/2003 | Chen et al. |
| 6,552,928 | B1 | 4/2003 | Qi et al. |
| 6,577,470 | B1 | 6/2003 | Rumpler |
| 6,583,961 | B2 | 6/2003 | Levi et al. |
| 6,583,968 | B1 | 6/2003 | Scura et al. |
| 6,597,548 | B1 | 7/2003 | Yamanaka et al. |
| 6,611,398 | B1 | 8/2003 | Rumpler et al. |
| 6,618,223 | B1 | 9/2003 | Chen et al. |
| 6,628,478 | B2 | 9/2003 | Gill |
| 6,629,357 | B1 | 10/2003 | Akoh |
| 6,633,464 | B2 | 10/2003 | Lai et al. |
| 6,636,394 | B1 | 10/2003 | Fukagawa et al. |
| 6,639,291 | B1 | 10/2003 | Sin et al. |
| 6,650,503 | B1 | 11/2003 | Chen et al. |
| 6,650,506 | B1 | 11/2003 | Risse |
| 6,654,195 | B1 | 11/2003 | Frank, Jr. et al. |
| 6,657,816 | B1 | 12/2003 | Barr et al. |
| 6,661,621 | B1 | 12/2003 | Iitsuka |
| 6,661,625 | B1 | 12/2003 | Sin et al. |
| 6,674,610 | B1 | 1/2004 | Thomas et al. |
| 6,680,863 | B1 | 1/2004 | Shi et al. |
| 6,683,763 | B1 | 1/2004 | Hiner et al. |
| 6,687,098 | B1 | 2/2004 | Huai |
| 6,687,178 | B1 | 2/2004 | Qi et al. |
| 6,687,977 | B2 | 2/2004 | Knapp et al. |
| 6,691,226 | B1 | 2/2004 | Frank, Jr. et al. |
| 6,697,294 | B1 | 2/2004 | Qi et al. |
| 6,700,738 | B1 | 3/2004 | Sin et al. |
| 6,700,759 | B1 | 3/2004 | Knapp et al. |
| 6,704,158 | B2 | 3/2004 | Hawwa et al. |
| 6,707,083 | B1 | 3/2004 | Hiner et al. |
| 6,713,801 | B1 | 3/2004 | Sin et al. |
| 6,721,138 | B1 | 4/2004 | Chen et al. |
| 6,721,149 | B1 | 4/2004 | Shi et al. |
| 6,721,203 | B1 | 4/2004 | Qi et al. |
| 6,724,569 | B1 | 4/2004 | Chen et al. |
| 6,724,572 | B1 | 4/2004 | Stoev et al. |
| 6,724,581 | B2 | 4/2004 | Westwood |
| 6,729,015 | B2 | 5/2004 | Matono et al. |
| 6,735,850 | B1 | 5/2004 | Gibbons et al. |
| 6,737,281 | B1 | 5/2004 | Dang et al. |
| 6,744,608 | B1 | 6/2004 | Sin et al. |
| 6,747,301 | B1 | 6/2004 | Hiner et al. |
| 6,751,055 | B1 | 6/2004 | Alfogaha et al. |
| 6,754,048 | B2 | 6/2004 | Li |
| 6,754,049 | B1 | 6/2004 | Seagle et al. |
| 6,756,071 | B1 | 6/2004 | Shi et al. |
| 6,757,140 | B1 | 6/2004 | Hawwa |
| 6,760,196 | B1 | 7/2004 | Niu et al. |
| 6,762,910 | B1 | 7/2004 | Knapp et al. |
| 6,765,756 | B1 | 7/2004 | Hong et al. |
| 6,775,902 | B1 | 8/2004 | Huai et al. |
| 6,778,358 | B1 | 8/2004 | Jiang et al. |
| 6,781,927 | B1 | 8/2004 | Heanuc et al. |
| 6,785,955 | B1 | 9/2004 | Chen et al. |
| 6,791,793 | B1 | 9/2004 | Chen et al. |
| 6,791,796 | B2 | 9/2004 | Shukh et al. |
| 6,791,807 | B1 | 9/2004 | Hikami et al. |
| 6,798,616 | B1 | 9/2004 | Seagle et al. |
| 6,798,625 | B1 | 9/2004 | Ueno et al. |
| 6,801,408 | B1 | 10/2004 | Chen et al. |
| 6,801,409 | B2 | 10/2004 | Michel et al. |
| 6,801,411 | B1 | 10/2004 | Lederman et al. |
| 6,803,615 | B1 | 10/2004 | Sin et al. |
| 6,806,035 | B1 | 10/2004 | Atireklapvarodom et al. |
| 6,807,030 | B1 | 10/2004 | Hawwa et al. |
| 6,807,332 | B1 | 10/2004 | Hawwa |
| 6,809,899 | B1 | 10/2004 | Chen et al. |
| 6,816,345 | B1 | 11/2004 | Knapp et al. |
| 6,818,330 | B2 | 11/2004 | Shukh et al. |
| 6,828,897 | B1 | 12/2004 | Nepela |
| 6,829,160 | B1 | 12/2004 | Qi et al. |
| 6,829,819 | B1 | 12/2004 | Crue, Jr. et al. |
| 6,833,979 | B1 | 12/2004 | Knapp et al. |
| 6,834,010 | B1 | 12/2004 | Qi et al. |
| 6,848,169 | B2 | 2/2005 | Shin et al. |
| 6,859,343 | B1 | 2/2005 | Alfoqaha et al. |
| 6,859,997 | B1 | 3/2005 | Tong et al. |
| 6,861,937 | B1 | 3/2005 | Feng et al. |
| 6,870,712 | B2 | 3/2005 | Chen et al. |
| 6,873,494 | B2 | 3/2005 | Chen et al. |
| 6,873,547 | B1 | 3/2005 | Shi et al. |
| 6,876,507 | B2 | 4/2005 | Chen et al. |
| 6,879,464 | B2 | 4/2005 | Sun et al. |
| 6,888,184 | B1 | 5/2005 | Shi et al. |
| 6,888,704 | B1 | 5/2005 | Diao et al. |
| 6,891,702 | B1 | 5/2005 | Tang |
| 6,894,871 | B2 | 5/2005 | Alfociaha et al. |
| 6,894,877 | B1 | 5/2005 | Crue, Jr. et al. |
| 6,906,894 | B2 | 6/2005 | Chen et al. |
| 6,909,578 | B1 | 6/2005 | Missell et al. |
| 6,912,106 | B1 | 6/2005 | Chen et al. |
| 6,927,952 | B2 | 8/2005 | Shimizu et al. |
| 6,934,113 | B1 | 8/2005 | Chen |
| 6,934,129 | B1 | 8/2005 | Zhang et al. |
| 6,940,688 | B2 | 9/2005 | Jiang et al. |
| 6,942,824 | B1 | 9/2005 | Li |
| 6,943,993 | B2 | 9/2005 | Chang et al. |
| 6,944,938 | B1 | 9/2005 | Crue, Jr. et al. |
| 6,947,258 | B1 | 9/2005 | Li |
| 6,950,266 | B1 | 9/2005 | McCaslin et al. |
| 6,954,332 | B1 | 10/2005 | Hong et al. |
| 6,958,885 | B1 | 10/2005 | Chen et al. |
| 6,961,221 | B1 | 11/2005 | Niu et al. |
| 6,965,494 | B2 | 11/2005 | Campbell et al. |
| 6,967,823 | B2 | 11/2005 | Nakamoto et al. |
| 6,969,989 | B1 | 11/2005 | Mei |
| 6,975,486 | B2 | 12/2005 | Chen et al. |
| 6,980,403 | B2 | 12/2005 | Hasegawa |
| 6,987,643 | B1 | 1/2006 | Seagle |
| 6,989,962 | B1 | 1/2006 | Dong et al. |
| 6,989,972 | B1 | 1/2006 | Stoev et al. |
| 6,998,061 | B1 | 2/2006 | Cross |
| 7,006,327 | B2 | 2/2006 | Krounbi et al. |
| 7,007,372 | B1 | 3/2006 | Chen et al. |
| 7,012,832 | B1 | 3/2006 | Sin et al. |
| 7,023,658 | B1 | 4/2006 | Knapp et al. |
| 7,026,063 | B2 | 4/2006 | Ueno et al. |
| 7,027,268 | B1 | 4/2006 | Zhu et al. |
| 7,027,274 | B1 | 4/2006 | Sin et al. |
| 7,029,771 | B2 | 4/2006 | Hasegawa et al. |
| 7,035,046 | B1 | 4/2006 | Young et al. |
| 7,041,985 | B1 | 5/2006 | Wang et al. |
| 7,046,487 | B2 | 5/2006 | Terunuma |
| 7,046,490 | B1 | 5/2006 | Ueno et al. |
| 7,054,113 | B1 | 5/2006 | Seagle et al. |
| 7,057,853 | B2 | 6/2006 | Okada et al. |
| 7,057,857 | B1 | 6/2006 | Niu et al. |
| 7,059,868 | B1 | 6/2006 | Yan |
| 7,092,195 | B1 | 8/2006 | Liu et al. |
| 7,110,289 | B1 | 9/2006 | Sin et al. |
| 7,111,382 | B1 | 9/2006 | Knapp et al. |
| 7,113,366 | B1 | 9/2006 | Wang et al. |
| 7,114,241 | B2 | 10/2006 | Kubota et al. |
| 7,116,517 | B1 | 10/2006 | He et al. |
| 7,124,654 | B1 | 10/2006 | Davies et al. |
| 7,126,788 | B1 | 10/2006 | Liu et al. |
| 7,126,790 | B1 | 10/2006 | Liu et al. |
| 7,131,346 | B1 | 11/2006 | Buttar et al. |
| 7,133,253 | B1 | 11/2006 | Seagle et al. |
| 7,134,185 | B1 | 11/2006 | Knapp et al. |
| 7,154,713 | B2 | 12/2006 | Watanabe et al. |
| 7,154,715 | B2 | 12/2006 | Yamanaka et al. |

(56) References Cited

U.S. PATENT DOCUMENTS

| | | | |
|---|---|---|---|
| 7,158,351 B2 | 1/2007 | Nakamoto et al. | |
| 7,166,173 B2 | 1/2007 | Beach | |
| 7,170,723 B2 | 1/2007 | Taguchi | |
| 7,170,725 B1 | 1/2007 | Zhou et al. | |
| 7,177,117 B1 | 2/2007 | Jiang et al. | |
| 7,180,712 B1 * | 2/2007 | Li | G11B 5/112 257/E43.004 |
| 7,193,815 B1 | 3/2007 | Stoev et al. | |
| 7,196,880 B1 | 3/2007 | Anderson et al. | |
| 7,199,974 B1 | 4/2007 | Alfoqaha | |
| 7,199,975 B1 | 4/2007 | Pan | |
| 7,211,339 B1 | 5/2007 | Seagle et al. | |
| 7,212,384 B1 | 5/2007 | Stoev et al. | |
| 7,238,292 B1 | 7/2007 | He et al. | |
| 7,239,478 B1 | 7/2007 | Sin et al. | |
| 7,248,431 B1 | 7/2007 | Liu et al. | |
| 7,248,433 B1 | 7/2007 | Stoev et al. | |
| 7,248,449 B1 | 7/2007 | Seagle | |
| 7,270,896 B2 | 9/2007 | Parkin | |
| 7,280,325 B1 | 10/2007 | Pan | |
| 7,283,327 B1 | 10/2007 | Liu et al. | |
| 7,284,316 B1 | 10/2007 | Huai et al. | |
| 7,286,329 B1 | 10/2007 | Chen et al. | |
| 7,289,303 B1 | 10/2007 | Sin et al. | |
| 7,292,409 B1 | 11/2007 | Stoev et al. | |
| 7,295,401 B2 | 11/2007 | Jayasekara et al. | |
| 7,296,339 B1 | 11/2007 | Yang et al. | |
| 7,307,814 B1 | 12/2007 | Seagle et al. | |
| 7,307,818 B1 | 12/2007 | Park et al. | |
| 7,310,204 B1 | 12/2007 | Stoev et al. | |
| 7,318,947 B1 | 1/2008 | Park et al. | |
| 7,324,309 B1 | 1/2008 | Wiesen et al. | |
| 7,333,295 B1 | 2/2008 | Medina et al. | |
| 7,337,530 B1 | 3/2008 | Stoev et al. | |
| 7,342,751 B2 | 3/2008 | Nagasaka et al. | |
| 7,342,752 B1 | 3/2008 | Zhang et al. | |
| 7,349,170 B1 | 3/2008 | Rudman et al. | |
| 7,349,179 B1 | 3/2008 | He et al. | |
| 7,354,664 B1 | 4/2008 | Jiang et al. | |
| 7,363,697 B1 | 4/2008 | Dunn et al. | |
| 7,369,360 B2 | 5/2008 | Vas'ko et al. | |
| 7,371,152 B1 | 5/2008 | Newman | |
| 7,372,665 B1 | 5/2008 | Stoev et al. | |
| 7,375,926 B1 | 5/2008 | Stoev et al. | |
| 7,379,269 B1 | 5/2008 | Krounbi et al. | |
| 7,382,574 B2 | 6/2008 | Li et al. | |
| 7,386,933 B1 | 6/2008 | Krounbi et al. | |
| 7,389,577 B1 | 6/2008 | Shang et al. | |
| 7,394,620 B2 | 7/2008 | Taguchi | |
| 7,417,832 B1 | 8/2008 | Erickson et al. | |
| 7,419,891 B1 | 9/2008 | Chen et al. | |
| 7,426,091 B2 | 9/2008 | Okada et al. | |
| 7,428,124 B1 | 9/2008 | Song et al. | |
| 7,430,098 B1 | 9/2008 | Song et al. | |
| 7,436,620 B1 | 10/2008 | Kang et al. | |
| 7,436,638 B1 | 10/2008 | Pan | |
| 7,440,220 B1 | 10/2008 | Kang et al. | |
| 7,443,632 B1 | 10/2008 | Stoev et al. | |
| 7,443,639 B2 | 10/2008 | Parkin | |
| 7,444,740 B1 | 11/2008 | Chung et al. | |
| 7,446,979 B2 | 11/2008 | Jayasekara | |
| 7,457,080 B2 | 11/2008 | Watabe et al. | |
| 7,493,688 B1 | 2/2009 | Wang et al. | |
| 7,508,627 B1 | 3/2009 | Zhang et al. | |
| 7,522,377 B1 | 4/2009 | Jiang et al. | |
| 7,522,379 B1 | 4/2009 | Krounbi et al. | |
| 7,522,382 B1 | 4/2009 | Pan | |
| 7,542,246 B1 | 6/2009 | Song et al. | |
| 7,548,400 B2 | 6/2009 | Kagami et al. | |
| 7,551,394 B2 | 6/2009 | Sasaki et al. | |
| 7,551,406 B1 | 6/2009 | Thomas et al. | |
| 7,552,523 B1 | 6/2009 | He et al. | |
| 7,554,765 B2 | 6/2009 | Shukh et al. | |
| 7,554,767 B1 | 6/2009 | Hu et al. | |
| 7,561,379 B2 | 7/2009 | Li et al. | |
| 7,583,466 B2 | 9/2009 | Kermiche et al. | |
| 7,595,967 B1 | 9/2009 | Moon et al. | |
| 7,599,154 B2 | 10/2009 | Sbiaa et al. | |
| 7,606,007 B2 | 10/2009 | Gill | |
| 7,606,010 B2 | 10/2009 | Parkin | |
| 7,639,457 B1 | 12/2009 | Chen et al. | |
| 7,652,854 B2 | 1/2010 | Kagarni et al. | |
| 7,656,611 B2 | 2/2010 | Liu et al. | |
| 7,660,080 B1 | 2/2010 | Liu et al. | |
| 7,666,467 B2 | 2/2010 | Parkin | |
| 7,672,080 B1 | 3/2010 | Tang et al. | |
| 7,672,086 B1 | 3/2010 | Jiang | |
| 7,684,160 B1 | 3/2010 | Erickson et al. | |
| 7,688,546 B1 | 3/2010 | Bai et al. | |
| 7,691,434 B1 | 4/2010 | Zhang et al. | |
| 7,695,761 B1 | 4/2010 | Shen et al. | |
| 7,706,108 B2 | 4/2010 | Gill | |
| 7,719,795 B2 | 5/2010 | Hu et al. | |
| 7,726,009 B1 | 6/2010 | Liu et al. | |
| 7,729,086 B1 | 6/2010 | Song et al. | |
| 7,729,087 B1 | 6/2010 | Stoev et al. | |
| 7,736,823 B1 | 6/2010 | Wang et al. | |
| 7,773,341 B2 | 8/2010 | Zhang et al. | |
| 7,785,666 B1 | 8/2010 | Sun et al. | |
| 7,796,356 B1 | 9/2010 | Fowler et al. | |
| 7,800,858 B1 | 9/2010 | Bajikar et al. | |
| 7,807,218 B2 | 10/2010 | Parkin | |
| 7,819,979 B1 | 10/2010 | Chen et al. | |
| 7,829,264 B1 | 11/2010 | Wang et al. | |
| 7,846,643 B1 | 12/2010 | Sun et al. | |
| 7,855,854 B2 | 12/2010 | Hu et al. | |
| 7,859,797 B2 | 12/2010 | Hoshino et al. | |
| 7,869,160 B1 | 1/2011 | Pan et al. | |
| 7,872,824 B1 | 1/2011 | MacChioni et al. | |
| 7,872,833 B2 | 1/2011 | Hu et al. | |
| 7,889,457 B2 | 2/2011 | Yazawa et al. | |
| 7,906,231 B2 | 3/2011 | Parkin | |
| 7,910,267 B1 | 3/2011 | Zeng et al. | |
| 7,911,735 B1 | 3/2011 | Sin et al. | |
| 7,911,737 B1 | 3/2011 | Jiang et al. | |
| 7,916,426 B2 | 3/2011 | Hu et al. | |
| 7,918,013 B1 | 4/2011 | Dunn et al. | |
| 7,933,096 B2 | 4/2011 | Allen et al. | |
| 7,968,219 B1 | 6/2011 | Jiang et al. | |
| 7,982,989 B1 | 7/2011 | Shi et al. | |
| 8,008,912 B1 | 8/2011 | Shang | |
| 8,012,804 B1 | 9/2011 | Wang et al. | |
| 8,015,692 B1 | 9/2011 | Zhang et al. | |
| 8,018,677 B1 | 9/2011 | Chung et al. | |
| 8,018,678 B1 | 9/2011 | Zhang et al. | |
| 8,024,748 B1 | 9/2011 | Moravec et al. | |
| 8,049,997 B2 | 11/2011 | Miyauchi et al. | |
| 8,072,705 B1 | 12/2011 | Wang et al. | |
| 8,074,345 B1 | 12/2011 | Anguelouch et al. | |
| 8,077,418 B1 | 12/2011 | Hu et al. | |
| 8,077,434 B1 | 12/2011 | Shen et al. | |
| 8,077,435 B1 | 12/2011 | Liu et al. | |
| 8,077,557 B1 | 12/2011 | Hu et al. | |
| 8,079,135 B1 | 12/2011 | Shen et al. | |
| 8,081,403 B1 | 12/2011 | Chen et al. | |
| 8,089,734 B2 | 1/2012 | Miyauchi et al. | |
| 8,091,210 B1 | 1/2012 | Sasaki et al. | |
| 8,097,846 B1 | 1/2012 | Anguelouch et al. | |
| 8,104,166 B1 | 1/2012 | Zhang et al. | |
| 8,116,043 B2 | 2/2012 | Leng et al. | |
| 8,116,171 B1 | 2/2012 | Lee | |
| 8,125,743 B2 | 2/2012 | Ohta et al. | |
| 8,125,856 B1 | 2/2012 | Li et al. | |
| 8,134,794 B1 | 3/2012 | Wang | |
| 8,136,224 B1 | 3/2012 | Sun et al. | |
| 8,136,225 B1 | 3/2012 | Zhang et al. | |
| 8,136,805 B1 | 3/2012 | Lee | |
| 8,141,235 B1 | 3/2012 | Zhang | |
| 8,146,236 B1 | 4/2012 | Luo et al. | |
| 8,149,536 B1 | 4/2012 | Yang et al. | |
| 8,151,441 B1 | 4/2012 | Rudy et al. | |
| 8,163,185 B1 | 4/2012 | Sun et al. | |
| 8,164,760 B2 | 4/2012 | Willis | |
| 8,164,855 B1 | 4/2012 | Gibbons et al. | |

(56) References Cited

U.S. PATENT DOCUMENTS

| | | |
|---|---|---|
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,402,635 B2 | 3/2013 | Degawa et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,437,105 B2 | 5/2013 | Vas'ko et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,451,567 B2 | 5/2013 | Zhou et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,147 B2 | 6/2013 | Singleton et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,514,524 B2 | 8/2013 | Wu et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |

(56) References Cited

U.S. PATENT DOCUMENTS

| | | |
|---|---|---|
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,638,530 B1 * | 1/2014 | Hsu ............... G11B 5/3912 360/319 |
| 8,643,980 B1 | 2/2014 | Fowler et al. |
| 8,649,123 B1 | 2/2014 | Zhang et al. |
| 8,649,124 B2 | 2/2014 | Zou et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2001/0043446 A1 | 11/2001 | Barlow et al. |
| 2002/0064002 A1 | 5/2002 | Gill |
| 2002/0149886 A1 | 10/2002 | Gill |
| 2003/0128483 A1 * | 7/2003 | Kamijo ............... B82Y 10/00 360/324.11 |
| 2004/0004786 A1 | 1/2004 | Shukh et al. |
| 2004/0120074 A1 | 6/2004 | Okada et al. |
| 2004/0196681 A1 | 10/2004 | Xiao et al. |
| 2005/0013044 A1 | 1/2005 | Hirata et al. |
| 2005/0264948 A1 | 12/2005 | Nakamoto et al. |
| 2006/0002015 A1 | 1/2006 | Gill et al. |
| 2006/0003185 A1 | 1/2006 | Parkin |
| 2006/0044682 A1 | 3/2006 | Le et al. |
| 2006/0109592 A1 | 5/2006 | Watanabe et al. |
| 2006/0119981 A1 | 6/2006 | Li et al. |
| 2007/0019341 A1 | 1/2007 | Mizuno et al. |
| 2007/0053114 A1 | 3/2007 | Uesugi et al. |
| 2007/0111332 A1 | 5/2007 | Zhao et al. |
| 2007/0195467 A1 | 8/2007 | Gill |
| 2008/0013221 A1 | 1/2008 | Ohta et al. |
| 2008/0179699 A1 | 7/2008 | Horng et al. |
| 2008/0239542 A1 | 10/2008 | Yuasa et al. |
| 2009/0027810 A1 | 1/2009 | Horng et al. |
| 2009/0052092 A1 | 2/2009 | Zhou et al. |
| 2009/0128944 A1 | 5/2009 | Jang et al. |
| 2009/0168240 A1 | 7/2009 | Hsiao et al. |
| 2009/0174971 A1 | 7/2009 | Tsuchiya et al. |
| 2009/0279213 A1 | 11/2009 | Wu et al. |
| 2010/0039734 A1 | 2/2010 | Hara et al. |
| 2010/0079917 A1 | 4/2010 | Miyauchi et al. |
| 2010/0214692 A1 | 8/2010 | Kief et al. |
| 2010/0290157 A1 | 11/2010 | Zhang et al. |
| 2010/0320076 A1 | 12/2010 | Zhao et al. |
| 2011/0007425 A1 | 1/2011 | Vas'ko et al. |
| 2011/0086240 A1 | 4/2011 | Xiang et al. |
| 2011/0097601 A1 | 4/2011 | Bai et al. |
| 2011/0249365 A1 | 10/2011 | Zeltser et al. |
| 2011/0273802 A1 | 11/2011 | Zhou et al. |
| 2011/0279923 A1 | 11/2011 | Miyauchi et al. |
| 2011/0317313 A1 | 12/2011 | Miyauchi et al. |
| 2012/0087045 A1 | 4/2012 | Yanagisawa et al. |
| 2012/0087046 A1 | 4/2012 | Yanagisawa et al. |
| 2012/0111826 A1 | 5/2012 | Chen et al. |
| 2012/0134057 A1 | 5/2012 | Song et al. |
| 2012/0147504 A1 | 6/2012 | Zhou et al. |
| 2012/0216378 A1 | 8/2012 | Emley et al. |
| 2012/0237878 A1 | 9/2012 | Zeng et al. |
| 2012/0250189 A1 | 10/2012 | Degawa et al. |
| 2012/0281320 A1 | 11/2012 | Singleton et al. |
| 2012/0298621 A1 | 11/2012 | Gao |
| 2012/0327537 A1 | 12/2012 | Singleton et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0049857 A1 | 2/2014 | Isowaki et al. |
| 2014/0154529 A1 | 6/2014 | Yang et al. |
| 2014/0175050 A1 | 6/2014 | Zhang et al. |
| 2014/0177093 A1 | 6/2014 | Hoshino et al. |
| 2015/0170686 A1 * | 6/2015 | Singleton ............ G11B 5/3912 360/319 |

OTHER PUBLICATIONS

Goncalo Albuquerque, et al., U.S. Appl. No. 14/577,961, filed Dec. 19, 2014, 48 pages.

* cited by examiner

METHOD AND SYSTEM FOR PROVIDING A READ TRANSDUCER HAVING SYMMETRIC ANTIFERROMAGNETICALLY COUPLED SHIELDS

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures 16. These magnetic bias structures are used to magnetically bias the sensor layer of the sensor 14.

Although the conventional transducer 10 functions, there are drawbacks. In particular, the nanostructure of the shields 12 and 20 may affect performance of the read sensor 14. As the conventional transducer 10 is scaled down for higher density media, the details of the structures of the shields 12 and 20 become more important to performance of the conventional transducer. As a result, the shields 12 and 20 may be more likely to adversely affect performance of the read sensor 14.

Accordingly, what is needed is a system and method for improving the performance of a magnetic recording read transducer.

DETAILED DESCRIPTION OF THE PREFERRED EMBODIMENTS

Figure 1:
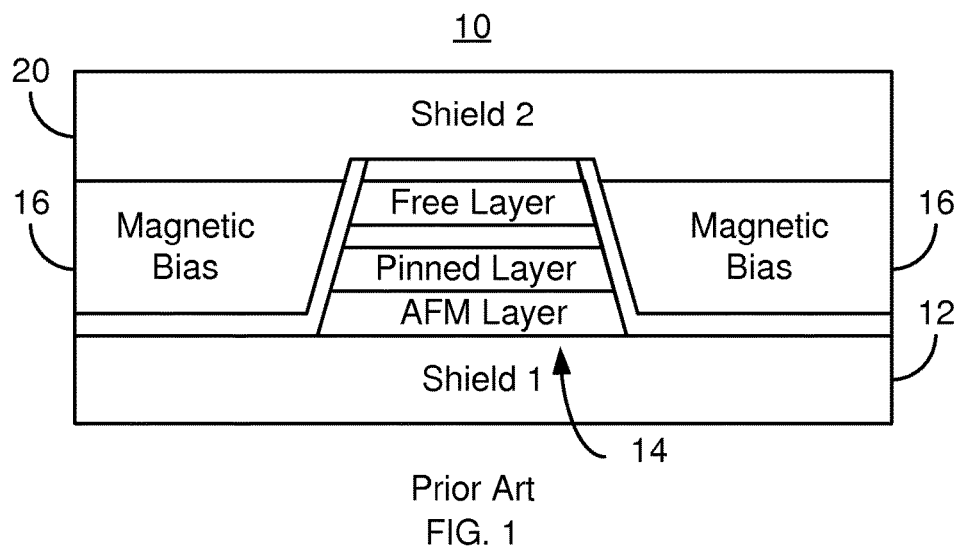
FIG. 1 depicts a conventional read transducer.
Figure 2:
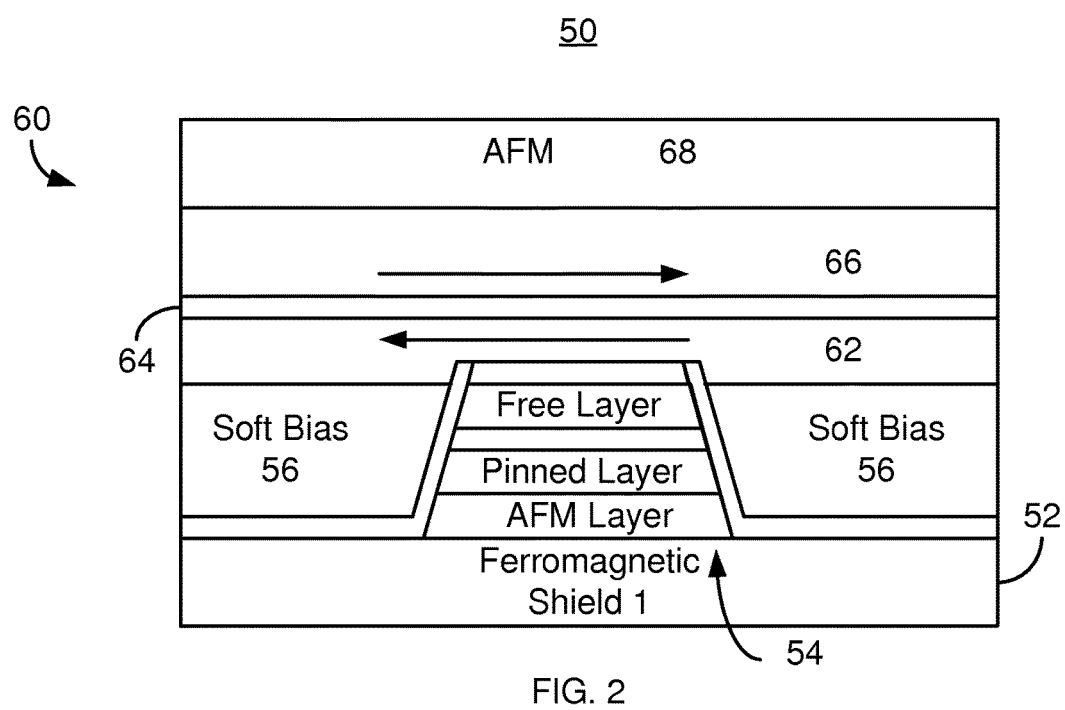
FIG. 2 depicts an ABS view of a more recent magnetic recording read transducer.

FIG. 2 depicts an ABS view of a portion of a more recently developed magnetic read transducer 50. For clarity, FIG. 2 is not to scale. The read transducer 50 may be part of a read head or may be part of a merged head that also includes a write transducer. The transducer 50 includes shields 52 and 60, a read sensor 54 and soft magnetic bias structures 56. The sensor 54 shown is a GMR or TMR sensor. Thus, the sensor 54 includes a pinning layer, a pinned, a nonmagnetic spacer layer, a free layer, and a capping layer. For simplicity, these layers are not separately labeled in FIG. 2. The sensor 54 may also include seed layer(s) (not shown). The magnetic bias structures 56 may be soft bias structures fabricated with soft magnetic material (s). The soft magnetic bias structures 56 have a high permeability and a low coercivity. For example, the soft magnetic bias structures 56 may include NiFe, such as Permalloy. The soft magnetic bias structures 56 magnetically bias the free layer.

The magnetic read transducer 50 also includes an antiferromagnetically biased second shield 60. The shield 60 includes ferromagnetic layers 62 and 66, nonmagnetic spacer layer 64, and pinning layer 68. The shield 60 may also include a capping layer 70. The ferromagnetic layers 62 and 66 are separated by nonmagnetic spacer layer 64. The nonmagnetic spacer layer 64 may be Ru, which allows the magnetic moments of the layers 62 and 66 to be coupled antiparallel. The moment of the ferromagnetic layer 66 is pinned by the pinning layer 68. The pinning layer is typically an antiferromagnet (AFM), such as IrMn.

Because the more recently developed magnetic transducer 50 has an antiferromagnetically coupled second shield 60, the performance of the magnetic transducer 50 may be improved. More specifically, the domains in the second shield 60 may be stabilized and noise reduced. However, at higher recording densities, issues may still exist due to the structures of the shields 52 and 60. Performance of the more recently developed magnetic transducer may thus be adversely affected.

Figure 3:
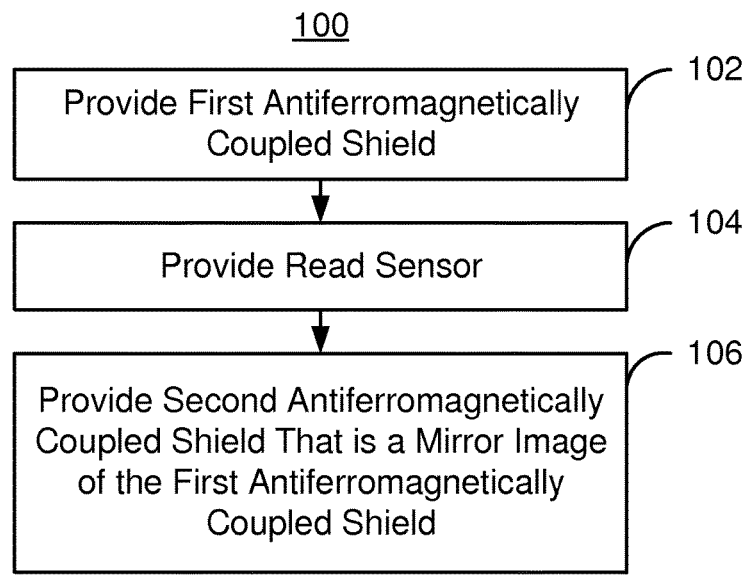
FIG. 3 is flow chart depicting an exemplary embodiment of a method for fabricating a magnetic recording read transducer.

FIG. 3 is an exemplary embodiment of a method 100 for providing a read transducer including a mirrored shield. For simplicity, some steps may be omitted, interleaved, and/or combined. The method 100 is also described in the context of providing a single recording transducer. However, the method 100 may be used to fabricate multiple transducers at substantially the same time. The method 100 is also described in the context of particular layers. A particular layer may include multiple materials and/or multiple sublayers. The method 100 also may start after formation of other portions of the magnetic recording transducer. For example, in some embodiments, a soft, ferromagnetic shield and a nonmagnetic spacer layer, such as aluminum oxide, are provided first.

A first antiferromagnetically coupled (AFC) shield is provided, via step 102. Step 102 typically includes depositing a first ferromagnetic layer, depositing a first nonmagnetic spacer layer on the first ferromagnetic layer and depositing second ferromagnetic layer on the first nonmagnetic spacer layer. The first nonmagnetic spacer layer is between the first ferromagnetic layer and the second ferromagnetic layer. Step 102 may include full film depositing the layers for the shield, masking the desired location of the shield and removing the exposed portions of the layers to form the shield. In other embodiments, a mask having an aperture therein or a nonmagnetic layer having a trench therein may be provided. The shield layers are deposited and the mask removed to form the shield in this embodiments.

The first nonmagnetic spacer layer is configured such that the first and second ferromagnetic layers are antiferromagnetically coupled. For example, the first nonmagnetic spacer layer may be Ru and configured such that a Ruderman-Kittel-Kasuya-Yosida (RKKY) coupling between the first and second ferromagnetic layers is antiferromagnetic in nature. The first magnetic layer has a first saturation magnetization and a first thickness. The second ferromagnetic layer has a second saturation magnetization and a second thickness. The first and second ferromagnetic layers may include one or more of NiFe, NiFeCo, CoFe, CoB, CoFeB and/or other ferromagnetic materials. The first and second ferromagnetic layers may, for example, have a thickness of at least fifty Angstroms and not more than five hundred Angstroms. In some embodiments, the first and second ferromagnetic layers may be formed of the same materials. In other embodiments, the first and second ferromagnetic layers may be formed of different materials. The first and/or second ferromagnetic layer(s) may also be a multilayer. For example, the first ferromagnetic layer may include a trilayer of $Co_{60}Fe_{40}/Ni_{81}Fe_{19}/Co_{60}Fe_{40}$. The second ferromagnetic layer may include a bilayer of $Co_{60}Fe_{40}/Ni_{81}Fe_{19}$. In such embodiments, the CoFe sublayers may be at least five and not more than twenty Angstroms thick and the NiFe sublayer(s) may be at least thirty Angstroms and not more than four hundred ninety Angstroms thick.

Step 102 may optionally include providing a pinning layer on which the first ferromagnetic layer resides. The pinning layer may be an antiferromagnet including but not limited to IrMn. In other embodiments, the pinning layer may be omitted. Further, step 102 may include providing one or more amorphous ferromagnetic layer(s) in the AFC shield. For example, CoFeB having at least ten atomic percent B may be provided. In some embodiments, CoFeB layers are provided in both of the first and second ferromagnetic layers. In other embodiments, only the first ferromagnetic layer includes the CoFeB layer. In alternate embodiments, only the second ferromagnetic layer includes the CoFeB layer. For example, the first ferromagnetic layer may include a multilayer of CoFe/NiFe/CoFeB/NiFe/CoFe. The second ferromagnetic layer may include a multilayer of CoFe/NiFe/CoFeB/NiFe. In other embodiments, different material(s) may be used.

A read sensor is provided on the first AFC shield, via step 104. The second ferromagnetic layer may be between the read sensor and the first ferromagnetic layer. In some embodiments, the read sensor is a TMR or GMR sensor. Thus, step 104 may include deposited a stack of layers including at least a ferromagnetic pinned layer, a thin nonmagnetic spacer layer and a ferromagnetic free layer. The pinned and free layers may be formed of the same or different material(s). A pinning layer adjoining the pinned layer may also be provided in step 104. For example, IrMn may be used as the pinning layer for the sensor. Step 104 may also include defining the edges of the read sensor in the track width and/or stripe height (perpendicular to the ABS) direction. The read sensor provided in step 104, may be suitable for use at higher recording densities. For example, the track width of the read sensor may be twenty nanometers or less. Magnetic bias structures might also be fabricated.

A second AFC shield is provided, via step 106. Step 106 typically includes depositing a third ferromagnetic layer, depositing a second nonmagnetic spacer layer on the third ferromagnetic layer and depositing fourth ferromagnetic layer on the second nonmagnetic spacer layer. The second nonmagnetic spacer layer is between the third ferromagnetic layer and the fourth ferromagnetic layer. Step 106 may include full film depositing the layers for the shield, masking the desired location of the shield and removing the exposed portions of the layers to form the shield. In other embodiments, a mask having an aperture therein or a nonmagnetic layer having a trench therein may be provided. The shield layers are deposited and the mask removed to form the shield in this embodiments.

The second nonmagnetic spacer layer is configured such that the third and fourth ferromagnetic layers are antiferromagnetically coupled. For example, the second nonmagnetic spacer layer may be Ru and configured such that an RKKY coupling between the third and fourth ferromagnetic layers is antiferromagnetic in nature. The third magnetic layer has a third saturation magnetization and a third thickness. The fourth ferromagnetic layer has a fourth saturation magnetization and a fourth thickness. The third and fourth ferromagnetic layers may include one or more of NiFe, NiFeCo, CoFe, CoB, CoFeB and/or other ferromagnetic materials. The third and fourth ferromagnetic layers may, for example, have a thickness of at least fifty Angstroms and not more than five hundred Angstroms. In some embodiments, the third and fourth ferromagnetic layers may be formed of the same materials. In other embodiments, the third and fourth ferromagnetic layers may be formed of different materials. The third and/or fourth ferromagnetic layer(s) may also be a multilayer. For example, the third ferromagnetic layer may include a bilayer of $Ni_{81}Fe_{19}/Co_{60}Fe_{40}$. The fourth ferromagnetic layer may include a trilayer of $Co_{60}Fe_{40}/Ni_{81}Fe_{19}/Co_{60}Fe_{40}$. In such embodiments, the CoFe sublayers may be at least five and not more than twenty Angstroms thick and the NiFe sublayer(s) may be at least thirty Angstroms and not more than four hundred ninety Angstroms thick.

Step 106 may optionally include providing a pinning layer on the fourth ferromagnetic layer. The pinning layer may be an antiferromagnet including but not limited to IrMn. In other embodiments, the pinning layer may be omitted. Further, step 106 may include providing one or more amorphous ferromagnetic layer(s) in the AFC shield. For example, CoFeB having at least ten atomic percent B may be provided. In some embodiments, CoFeB layers are provided in both of the third and fourth ferromagnetic layers. In other embodiments, only the third ferromagnetic layer includes the CoFeB layer. In alternate embodiments, only the fourth ferromagnetic layer includes the CoFeB layer. For example, the third ferromagnetic layer may include a multilayer of NiFe/CoFeB/NiFe/CoFe. The fourth ferromagnetic layer may include a multilayer of CoFe/NiFe/CoFe. In other embodiments, different material(s) may be used.

Steps 102 and 106 are performed such that the second AFC shield is a mirror image of the first AFC shield. Stated differently, step 106 is performed such that the second AFC shield is a mirror image of the first AFC shield. For a mirror, the saturation magnetizations multiplied by thickness(es) of the first AFC shield match those of the second AFC shield to within twenty percent. In some embodiments, the second AFC shield is a mirror of the first AFC if the second saturation magnetization multiplied by the second thickness matches the third saturation magnetization multiplied by the third thickness to within twenty percent. In some such embodiments, these products match to within ten percent. In some embodiments, the second AFC shield is a mirror of the first AFC if the first saturation magnetization multiplied by the first thickness matches the fourth saturation magnetization multiplied by the fourth thickness to within twenty percent. In some embodiments, these products match to within ten percent. In some embodiments, the second saturation magnetization multiplied by the second thickness matches the third saturation magnetization multiplied by the third thickness to within twenty percent and first saturation magnetization multiplied by the first thickness matches the fourth saturation magnetization multiplied by the fourth thickness to within twenty percent. In some cases, these products match to within ten percent.

In some embodiments, this mirroring may be achieved by using the same material(s) in the second and third ferromagnetic layers and/or in the first and fourth ferromagnetic layers. In such embodiments, the thicknesses of the second and third ferromagnetic layers and/or the thicknesses of the first and fourth ferromagnetic layers may match to within the percentages described above. In other embodiments, however, different materials may be used in different layers.

In addition, symmetry may be desired with respect to the free layer for the first AFC shield to mirror the second AFC shield. Thus, the distance between a center of the second ferromagnetic layer and the free layer may match the distance between a center of the third ferromagnetic layer and the free layer to within twenty percent. In some embodiments, these distances may match to within ten percent. Similarly, the distance between a center of the first ferromagnetic layer and the free layer may match the distance between a center of the fourth ferromagnetic layer and the free layer to within twenty percent.

Thus, the AFC shield fabricated in step 102 and the AFC shield formed in step 106 are manufactured such that one is a mirror of the other as described above. However, a particular direction of magnetization is not required for the shields. For example, in some embodiments, the magnetic moment of the second ferromagnetic layer is antiferromagnetically aligned with the magnetic moment of the third ferromagnetic layer. In other embodiments, the magnetic moment of the second ferromagnetic layer has a second ferromagnetic layer magnetic moment that is aligned parallel with a third ferromagnetic layer magnetic moment of the third ferromagnetic layer.

Figure 4:
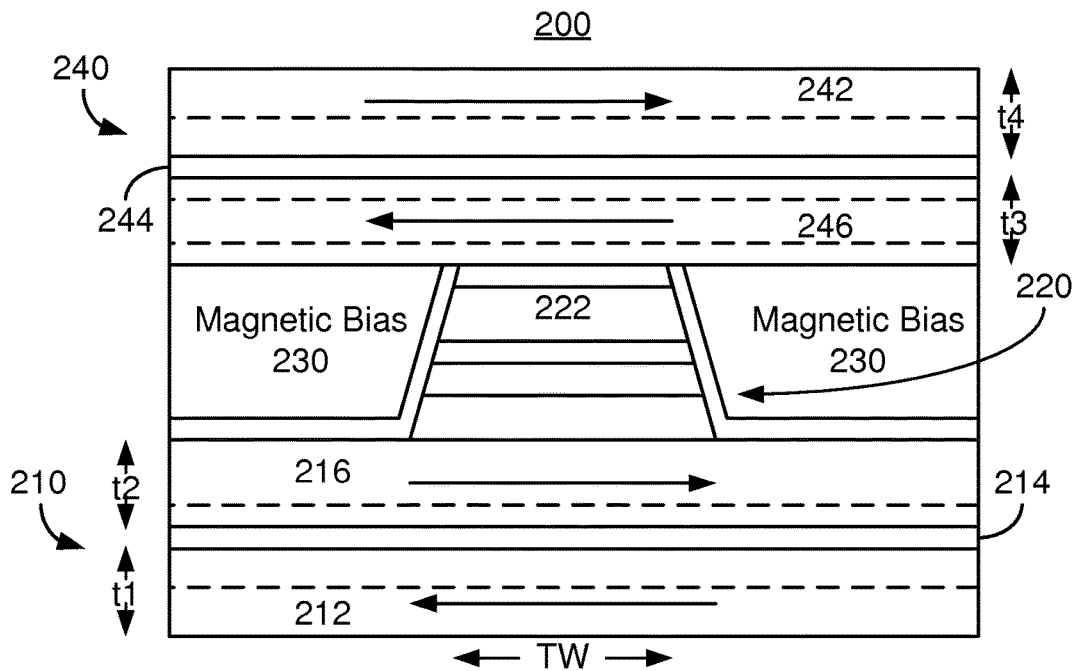
FIG. 4 is an ABS view of an exemplary embodiment of a portion of a magnetic recording read transducer.

FIG. 4 is an ABS view of an exemplary embodiment of a portion of a magnetic recording read transducer 200 formed using the method 100. For clarity, FIG. 4 is not to scale. The read transducer 200 may be part of a read head or may be part of a merged head that also includes a write transducer. The head of which the read transducer 200 is part of a disk drive having a media, a slider and the head coupled with the slider. The read transducer 200 is also described in the context of particular components. In other embodiments, some of the components may be omitted, provided in a different location, or have different constituents. Further, other components may be used.

The transducer 200 includes a first AFC shield 210, a read sensor 220, magnetic bias structure 230 and a second AFC shield 240. Other components may be included in the read transducer 200 but are not shown. The read sensor 220 may be a TMR sensor, a GMR sensor or another sensor. The read sensor 220 includes a sensor layer 222. In some embodiments, the sensor layer 222 is a free layer. Thus, the sensor 220 may include a pinning layer, a pinned layer, a nonmagnetic spacer layer, a free (sensor) layer 222, and a capping layer. The sensor 220 may also include seed layer(s) (not shown). In other embodiments, the pinning layer may be omitted or may use a different pinning mechanism. The read sensor layer 222 has a track width, TW. In some embodiments, TW is not greater than twenty nanometers. In other embodiments, other track widths are possible. The magnetic bias structures 130 may be hard or soft magnetic bias structures.

The first AFC shield 210 includes ferromagnetic layers 212 and 216 separated by a nonmagnetic spacer layer 214. The second AFC shield 240 includes ferromagnetic layers 246 and 242 separated by nonmagnetic spacer layer 244. For simplicity, optional seed and/or capping layer are not shown in FIG. 4. The ferromagnetic layers 212, 216, 242 and 246 may be single layers. One or more of the ferromagnetic layers 212, 216, 242 and 246 may be multilayer. This possibility is indicated by the dashed lines in layers 212, 216, 242 and 246. The dashed lines also indicate that the layers 212, 216, 242 and/or 246 need not have the same number of layers. Although they may be mirrors, as discussed below, the layers 216 and 246 need not contain the same number of layers or be made of the same materials. Similarly, the layers 212 and 242 need not contain the same number of layers or be made of the same materials. In some embodiments, the layers 216 and 246 include a bilayer of $Ni_{81}Fe_{19}/Co_{60}Fe_{40}$. In some such embodiments, the layers 212 and 246 may include a trilayer of $Co_{60}Fe_{40}/Ni_{81}Fe_{19}/Co_{60}Fe_{40}$. As discussed above, the AFC shield 210 and/or 220 may include one or more amorphous magnetic layers. In some embodiments, these amorphous magnetic layers are interlayers within the ferromagnetic layer(s) 212, 216, 242 and/or 246. For example, the layer(s) 212, 216, 242 and/or 246 may include CoFeB having at least ten atomic percent B. For example, the ferromagnetic layers 212 and/or 242 may include multilayer (from bottom to top) of NiFe/CoFeB/NiFe/CoFe. The ferromagnetic layer(s) 216 and/or 246 may include a multilayer (from bottom to top) of CoFe/NiFe/CoFeB/NiFe/CoFe.

The ferromagnetic layers 212, 216, 242 and 246 may be magnetically soft. The ferromagnetic layers 212 and 216 are also antiferromagnetically coupled through the nonmagnetic spacer layer 214, for example via an RKKY coupling. In some embodiments, therefore, the nonmagnetic spacer layer 214 may be Ru. Further, in some embodiments, the spacer layer 214 may be configured such that the second antiferromagnetic coupling peak in the RKKY coupling is used for the first AFC shield 210. In other embodiments, other peaks, such as the first peak, in the RKKY coupling may be used. Similarly, the ferromagnetic layers 242 and 246 are antiferromagnetically coupled through the nonmagnetic spacer layer 244, for example via an RKKY coupling. In some embodiments, therefore, the nonmagnetic spacer layer 244 may be Ru. However, in some embodiments, the spacer layer 244 may be configured such that the first antiferromagnetic coupling peak in the RKKY coupling is used for the second AFC shield 240. In other embodiments, other peaks, such as the first peak, in the RKKY coupling may be used. Note that, the thicknesses of the layers 214 and 244 may differ. One or both of the shields 210 and 240 may also include a pinning layer adjoining the layer 212 or 242.

As discussed above, the AFC shields 210 and 240 are mirrors and may be symmetric with respect to the sensor layer 222. Thus, the thickness, t2, of layer 216 multiplied by its saturation magnetization may match the thickness, t3, of the ferromagnetic layer 246 multiplied by its saturation magnetization to within the percentages described above. Similarly, the thickness, t1, of layer 212 multiplied by its saturation magnetization may match the thickness, t4, of the ferromagnetic layer 242 multiplied by its saturation magnetization to within the percentages described above. In addition, the AFC shields 210 and 240 may be desired to be symmetric with respect to the location of the sensor layer 222. As can be seen in FIG. 4, the sensor layer 222 may not be located at the center of the sensor 220. In some embodiments, therefore, the centers of the ferromagnetic layers 246 and/or 242 may be a different distance from the center of the read sensor 220 than the centers of the ferromagnetic layers 216 and/or 212, respectively.

The magnetic transducer 200 fabricated using the method 100 may have improved performance, particularly at higher recording densities and smaller track widths of the read sensor 220. Because of the symmetry between the mirrored AFC shields 210 and 240, there may be less magnetic noise. The configuration of the AFC shields 210 and 240 may also reduce disturbances due to internal write fields or external stray fields near the sensor 220. Consequently, performance of the magnetic transducer 200 may be improved.

Figure 5:
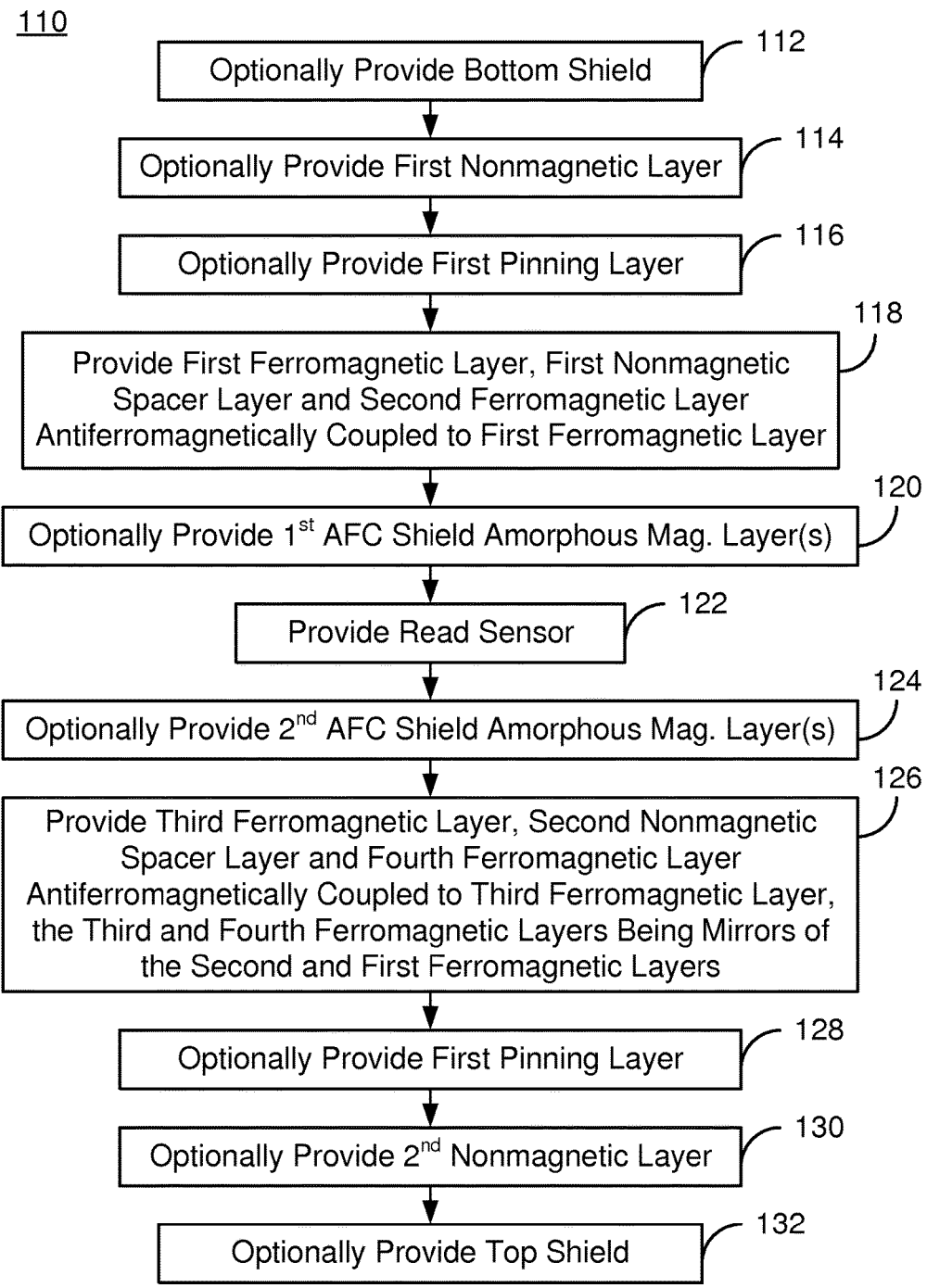
FIG. 5 is flow chart depicting another exemplary embodiment of a method for fabricating a magnetic recording read transducer.

FIG. 5 is flow chart depicting another exemplary embodiment of a method 110 for fabricating a magnetic recording read transducer including mirrored AFC shields. For simplicity, some steps may be omitted, interleaved, and/or combined. The method 110 is also described in the context of providing a single recording transducer. However, the method 110 may be used to fabricate multiple transducers at substantially the same time. The method 110 is also described in the context of particular layers. A particular layer may include multiple materials and/or multiple sublayers. The method 110 also may start after formation of other portions of the magnetic recording transducer.

A first, bottom shield is optionally provided, via step 112. Step 112 typically includes plating a large high permeability layer. A first nonmagnetic layer may also be optionally provided, via step 114. Step 114 may include depositing an aluminum oxide layer on the bottom shield. This layer may be on the order of one hundred nanometers to one thousand nanometers thick.

A first AFC shield is provided in step 116, 118 and 120. Steps 116, 118 and 120 are thus analogous to step 102 of the method 100. A first pinning layer is optionally provided, via step 116. Step 116 may include depositing an antiferromagnetic layer, such as IrMn. The AFC layers are provided, via step 118. Step 118 thus includes depositing a first ferromagnetic layer, depositing a first nonmagnetic spacer layer on the first ferromagnetic layer and depositing second ferromagnetic layer on the first nonmagnetic spacer layer. The first nonmagnetic spacer layer is between the first ferromagnetic layer and the second ferromagnetic layer. The first nonmagnetic spacer layer is configured such that the first and second ferromagnetic layers are antiferromagnetically coupled, as discussed above. The first magnetic layer has a first saturation magnetization and a first thickness. The second ferromagnetic layer has a second saturation magnetization and a second thickness. The first and second ferromagnetic layers may include one or more of NiFe, NiFeCo, CoFe, CoB, CoFeB and/or other ferromagnetic materials. The first and/or second ferromagnetic layer(s) may also be a multilayer. One or more amorphous ferromagnetic layer(s) are provided in the first AFC shield, via step 120. For example, CoFeB having at least ten atomic percent B may be provided. Although depicted as separate from step 118, the amorphous ferromagnetic layers of step 120 may be insertion layers within the first and/or second ferromagnetic layers provided in step 118.

The read sensor is provided on the first AFC shield, via step 122. Step 122 may include depositing the layers for the sensor, then defining the sensor in at least the track width direction using an ion mill. In some embodiments, some or all of the layers in the sensor are also defined in the stripe height direction. The sensor provided in step 122 may be a TMR sensor, a GMR sensor or another type of sensor. The read sensor provided in step 122 may be suitable for use at higher recording densities. For example, the track width of the read sensor may be twenty nanometers or less. Magnetic bias structures might also be fabricated. As part of step 122, the magnetic bias, insulating and/or other structures for the read sensor may be provided.

A second AFC shield that is a mirror of the first AFC shield is provided in step 124, 126 and 128. Steps 124, 126 and 128 are thus analogous to step 106 of the method 100. One or more amorphous ferromagnetic layer(s) are provided in the second AFC shield, via step 124. For example, CoFeB having at least ten atomic percent B may be provided. Although depicted as separate from step 126, described below, the amorphous ferromagnetic layers of step 124 may be insertion layers within the third and/or fourth ferromagnetic layers provided in step 124. The AFC layers are provided, via step 124. Step 124 thus includes depositing a third ferromagnetic layer, depositing a second nonmagnetic spacer layer on the third ferromagnetic layer and depositing fourth ferromagnetic layer on the second nonmagnetic spacer layer. The second nonmagnetic spacer layer is between the third ferromagnetic layer and the fourth ferromagnetic layer. The first second nonmagnetic spacer layer is configured such that the third and fourth ferromagnetic layers are antiferromagnetically coupled, as discussed above. The third magnetic layer has a third saturation magnetization and a third thickness. The fourth ferromagnetic layer has a fourth saturation magnetization and a fourth thickness. The third and fourth ferromagnetic layers may include one or more of NiFe, NiFeCo, CoFe, CoB, CoFeB and/or other ferromagnetic materials. The third and/or fourth ferromagnetic layer(s) may also be a multilayer. A second pinning layer is optionally provided on the AFC layers, via step 128. Step 128 may include depositing an antiferromagnetic layer, such as IrMn.

A second nonmagnetic layer may be optionally provided, via step 130. Step 130 may include depositing an aluminum oxide layer on the second AFC shield. The aluminum oxide layer may be at least one hundred nanometers thick and not more than one thousand nanometers thick. A second, top shield is optionally provided, via step 132. Step 132 typically includes plating a large high permeability layer.

Using the method 110, a transducer having mirrored AFC shields may be provided. The magnetic transducer 200 fabricated using the method 110 may have improved performance, particularly at higher recording densities and smaller track widths of the read sensor. Because of the symmetry between the mirrored AFC shields, there may be less magnetic noise, reduced disturbances due to internal or external fields near the sensor. Consequently, performance of the magnetic transducer may be improved.

Figure 6:
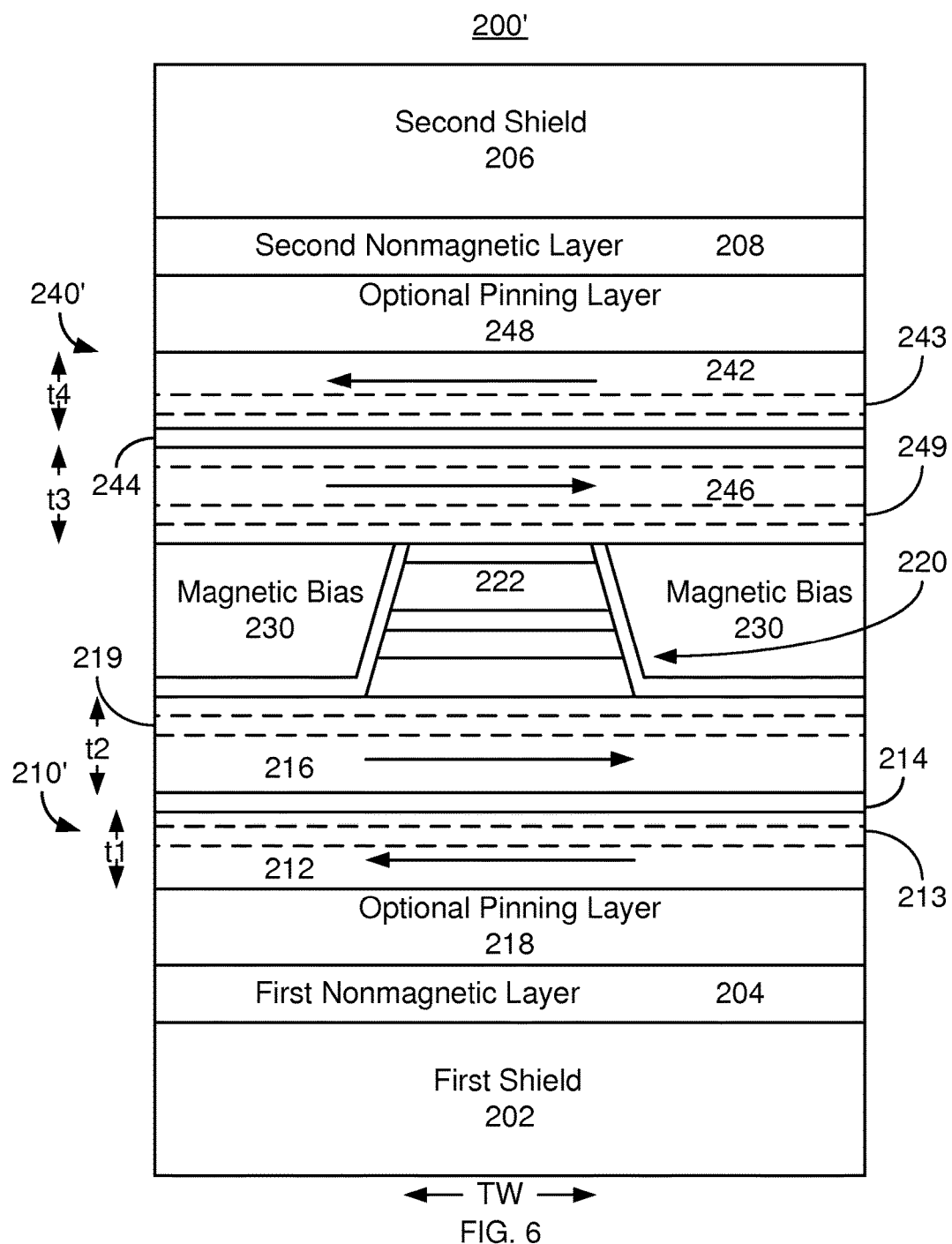
FIG. 6 depicts an ABS view of another exemplary embodiment of a portion of a magnetic recording read transducer.

FIG. 6 depicts an ABS view of another exemplary embodiment of a portion of a magnetic recording read transducer having mirrored AFC shields and which may be fabricated using the method 110. For clarity, FIG. 6 is not to scale. The read transducer 200' may be part of a read head or may be part of a merged head that also includes a write transducer. The head of which the read transducer 200' is part of a disk drive having a media, a slider and the head coupled with the slider. The read transducer 200' is also described in the context of particular components. In other embodiments, some of the components may be omitted, provided in a different location, or have different constituents. Further, other components may be used.

The magnetic write transducer 200' is analogous to the magnetic write transducer 200. The transducer 200' thus includes a first AFC shield 210', a read sensor 220, magnetic bias structure 230 and a second AFC shield 240' analogous to the first AFC shield 210, the read sensor 220, the magnetic bias structure 230 and the second AFC shield 240, respectively. The structure and function of the components 210', 220, 230 and 240' may thus be analogous to that of the components 210, 220, 230 and 240, respectively. Other components may be included in the read transducer 200 but are not shown. The read sensor 220 may be a TMR sensor, a GMR sensor or another sensor. The read sensor 220 includes a sensor layer 222. In some embodiments, the sensor layer 222 is a free layer. The read sensor layer 222 has a track width, TW. In some embodiments, TW is not greater than twenty nanometers. In other embodiments, other track widths are possible. The magnetic bias structures 130 may be hard or soft magnetic bias structures.

The magnetic transducer 200' is also shown as including optional first (bottom) shield 202, optional first nonmagnetic layer 204, optional second nonmagnetic layer 208 and optional second shield 206. In some embodiments, the shields 202 and 206 are mirrors. Stated differently, the saturation magnetization multiplied by the thickness of the first shield 202 may match the saturation magnetization multiplied by the thickness of the second shield 206 to within twenty percent. The shields 202 and 206 may also be desired to be symmetric with respect to the sensor layer 222 of the sensor 220. Thus, the shields 202 and 206 may be desired to be the same distance from the sensor layer 222 to within twenty percent. The thicknesses of various layers, such as the layers 204 and/or 208 may be adjusted. The shields 202 and 206 may be made of the same or different materials. Similarly, the nonmagnetic spacer layers 204 and 208 may be made of the same or different materials. In other embodiments, one or more of the layers 202, 204, 206 and 208 may be omitted.

The first AFC shield 210' includes ferromagnetic layers 212 and 216 separated by a nonmagnetic spacer layer 214. The first AFC shield 210' may also include optional pinning layer 218. In some embodiments, the pinning layer 218 may be omitted. Also shown in the first AFC shield are amorphous ferromagnetic layers 213 and 219 within ferromagnetic layers 212 and 216, respectively. The presence of layers 213 and 219 is thus indicated by dashed lines. In other embodiments, the amorphous ferromagnetic layer(s) 213 and/or 219 could be located outside of the ferromagnetic layers 212 and 216, respectively, or omitted. In other embodiments, one or both of the layers 213 and 219 may be omitted. For simplicity, optional seed and/or capping layer are not shown.

The second AFC shield 240' includes ferromagnetic layers 242 and 246 separated by a nonmagnetic spacer layer 244. The second AFC shield 240' may also include optional pinning layer 248. In some embodiments, the pinning layer 248 may be omitted. Also shown in the first AFC shield are amorphous ferromagnetic layers 243 and 249 within ferromagnetic layers 242 and 246, respectively. The presence of layers 243 and 249 is thus indicated by dashed lines. In other embodiments, the amorphous ferromagnetic layer(s) 243 and/or 249 could be located outside of the ferromagnetic layers 242 and 246, respectively, or omitted. In other embodiments, one or both of the layers 243 and 249 may be omitted. For simplicity, optional seed and/or capping layer are not shown. In some embodiments, the layers 216 and 246 include a bilayer (from bottom to top) of $Ni_{81}Fe_{19}/Co_{60}Fe_{40}$. In some such embodiments, the layers 212 and 246 may include a trilayer (from bottom to top) of $Co_{60}Fe_{40}/Ni_{81}Fe_{19}/Co_{60}Fe_{40}$. In some embodiments, amorphous magnetic layers 213, 219, 243 and/or 249 are present. For example, the layer(s) 212, 216, 242 and/or 246 may include CoFeB having at least ten atomic percent B may be provided. For example, the ferromagnetic layers 212 and/or 242 may include multilayer of NiFe/CoFeB (layer 213 or 243)/NiFe/ CoFe. The ferromagnetic layer(s) 216 and/or 246 may include a multilayer of CoFe/NiFe/CoFeB (layer 219 or 249)/NiFe.

As discussed above with respect to the shields 210 and 240, the AFC shields 210' and 240' are mirrors and may be symmetric with respect to the sensor layer 222. Thus, the thicknesses, t1, t2, t3 and/or t4 and the saturation magnetizations of the layers 212, 216, 242 and/or 246 are as discussed above. Similarly, the thicknesses and other features of the nonmagnetic spacer layers 214 and 244 are as discussed above.

The magnetic transducer 200' fabricated using the method 110 may have improved performance, particularly at higher recording densities and smaller track widths of the read sensor 220. Because of the symmetry between the mirrored AFC shields 210' and 240', there may be less magnetic noise. The configuration of the AFC shields 210' and 240' may also reduce disturbances due to internal write fields or external stray fields near the sensor 220. Consequently, performance of the magnetic transducer 200 may be improved.

Figure 7:
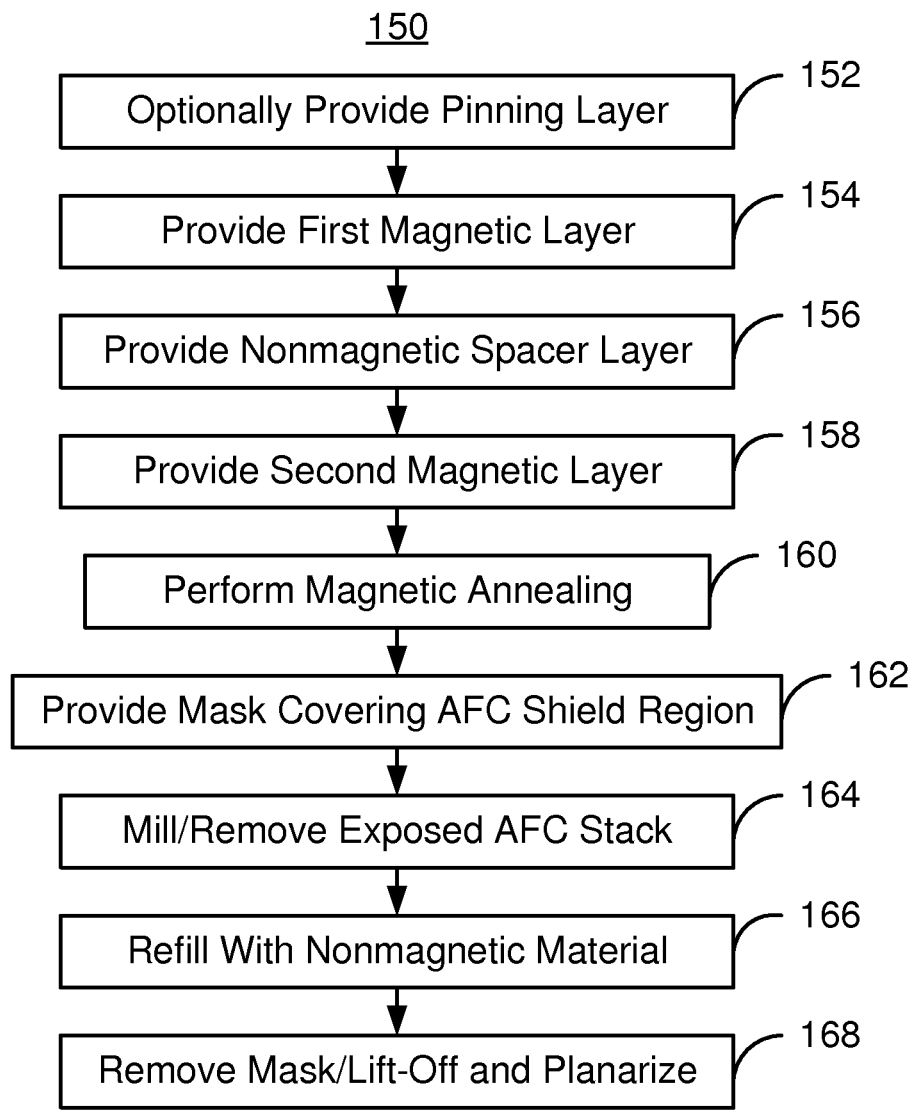
FIG. 7 is flow chart depicting another exemplary embodiment of a method for fabricating a magnetic recording read transducer.

FIG. 7 is flow chart depicting another exemplary embodiment of a method 150 for fabricating an AFC shield in a magnetic recording read transducer. For simplicity, some steps may be omitted, interleaved, and/or combined. FIGS. 8-12 depicts an ABS view of another exemplary embodiment of a portion of a magnetic recording read transducer 250 during fabrication. For clarity, FIGS. 8-12 are not to scale. The method 150 is described in the context of providing a single recording transducer 250. However, the method 150 may be used to fabricate multiple transducers at substantially the same time and/or another transducer. The method 150 is also described in the context of particular layers. A particular layer may include multiple materials and/or multiple sub-layers. The method 150 also may start after formation of other portions of the magnetic recording transducer.

Figure 8:
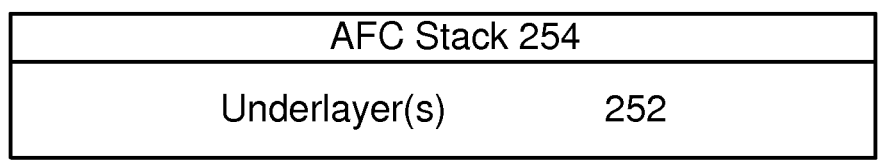
FIGS. 8-12 depicts an ABS view of another exemplary embodiment of a portion of a magnetic recording read transducer during fabrication.

The first pinning layer is optionally provided, via step 152. Step 152 may thus be performed only if the pinning layer 218 is to be used. The first magnetic layer is deposited, via step 154. The first nonmagnetic spacer layer is provided, via step 156. The second magnetic layer is deposited, via step 158. Steps 152, 154, 156 and 158 may include full-film depositing the layers. An anneal may then be performed, via step 160. For example, the anneal of step 160 may be performed at high temperatures in order to set the magnetization direction of the first magnetic layer. FIG. 8 depicts an ABS view of the transducer 250 after step 160 is performed. Thus, an AFC stack 254 is shown on underlayer (s) 252. The underlayer(s) 252 may include the bottom shield and first nonmagnetic layer. The AFC stack 254 may include not only the first and second ferromagnetic layers separated by first nonmagnetic spacer layer but also the first pinning layer.

Figure 9:
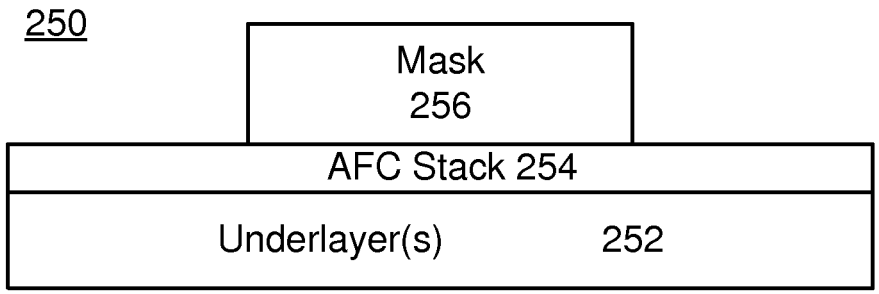

A mask that covers the desired region for the first AFC shield is provided, via step 162. This step may include photolithographically forming the mask. FIG. 9 depicts the transducer 250 after step 162 is performed. Thus, a mask 256 has been provided.

Figure 10:
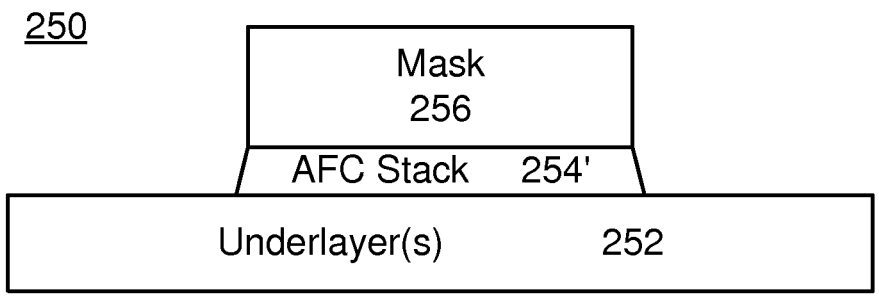
Figure 11:
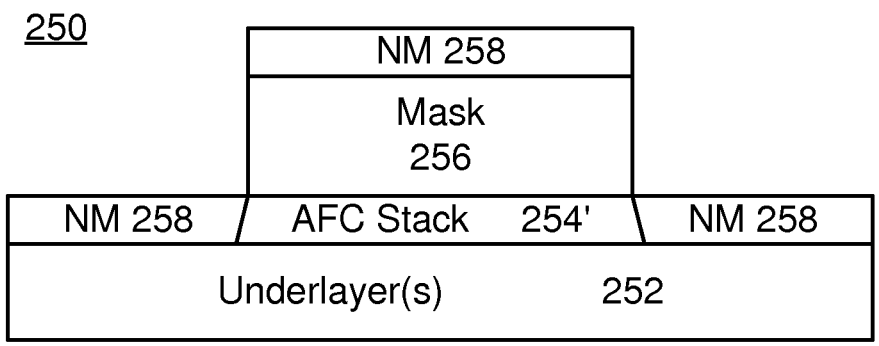
Figure 12:
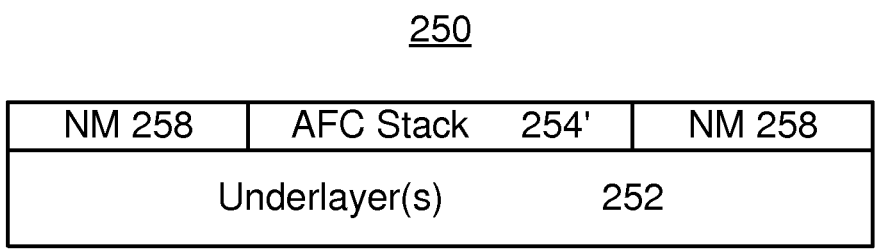

The exposed portion of the AFC stack is removed, for example via ion milling, via step 164. FIG. 10 depicts an ABS view of the transducer 250 after step 164 is performed. Thus, the edges of the AFC stack 254' have been defined in at least the track width direction. A refill step if performed, via step 166. Step 166 may include depositing a nonmagnetic material, such as aluminum oxide, while the mask 256 remains in place. FIG. 11 depicts the transducer after step 166 is performed. Thus, the nonmagnetic layer 258 is shown. The mask 256 is lifted off, via step 168. Also in step 168, the transducer may be planarized. FIG. 12 depicts the transducer 250 after step 168 is performed. Thus, the AFC shield 254' remains. Fabrication of other components of the transducer may then be completed.

The magnetic transducer 250 fabricated using the method 150 may have improved performance, particularly at higher recording densities and smaller track widths of the read sensor. Because of the symmetry between the mirrored AFC shields 254' and the remaining shield (not shown), there may be less magnetic noise. The configuration of the AFC shield 254' and its mirror may also reduce disturbances due to internal write fields or external stray fields near the sensor. Consequently, performance of the magnetic transducer 250 may be improved.

Figure 13:
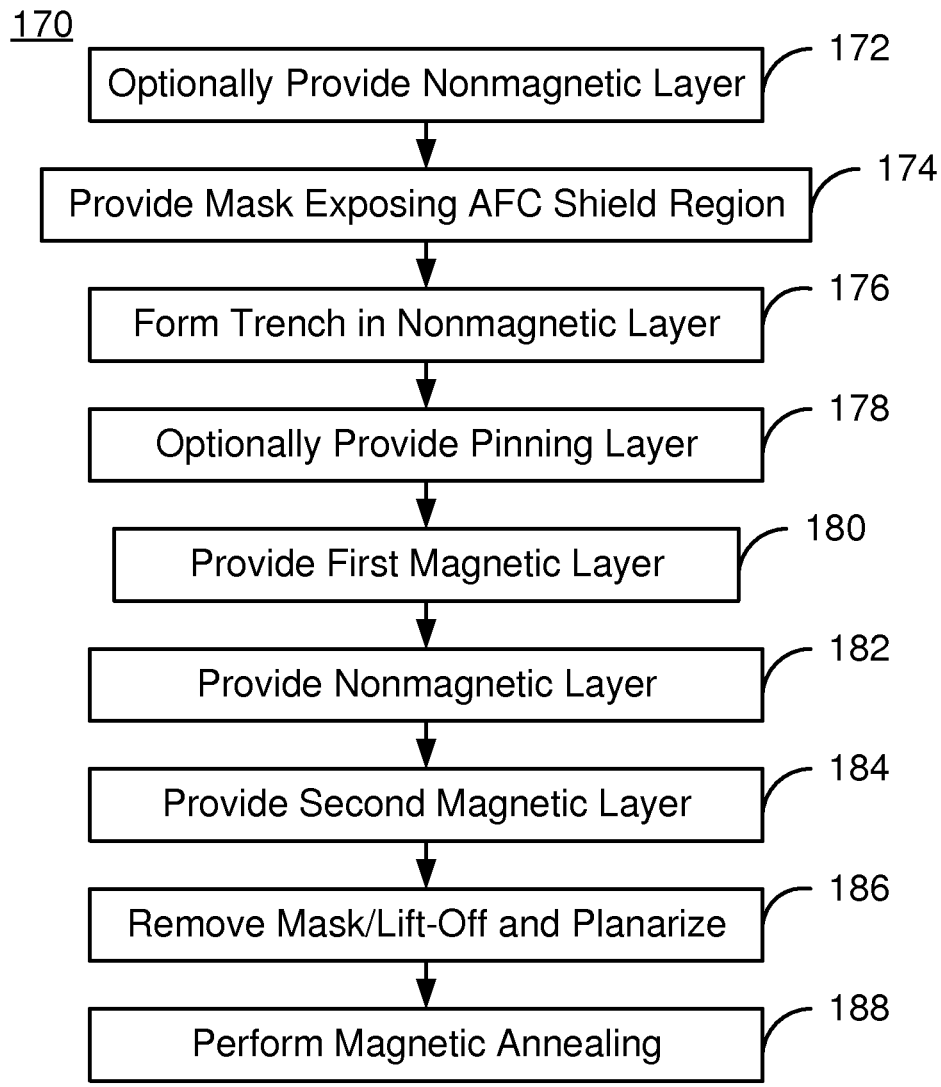
FIG. 13 is flow chart depicting another exemplary embodiment of a method for fabricating a magnetic recording read transducer.

FIG. 13 is flow chart depicting another exemplary embodiment of a method 170 for fabricating an AFC shield in a magnetic recording read transducer. For simplicity, some steps may be omitted, interleaved, and/or combined. FIGS. 14-17 depicts an ABS view of another exemplary embodiment of a portion of a magnetic recording read transducer 270 during fabrication. For clarity, FIGS. 14-17 are not to scale. The method 170 is described in the context of providing a single recording transducer 270. However, the method 170 may be used to fabricate multiple transducers at substantially the same time and/or another transducer. The method 170 is also described in the context of particular layers. A particular layer may include multiple materials and/or multiple sub-layers. The method 170 also may start after formation of other portions of the magnetic recording transducer.

Figure 14:
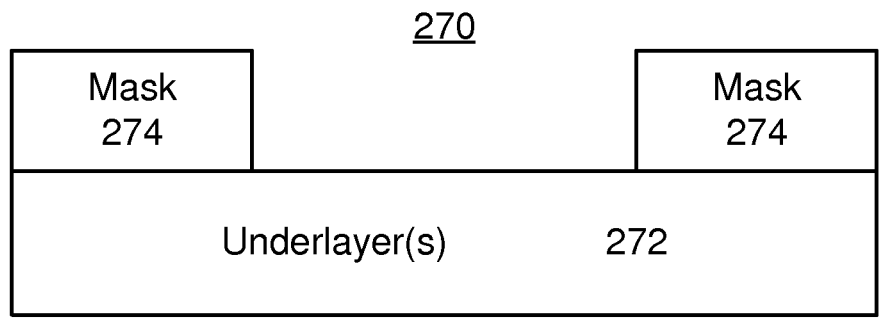
FIGS. 14-17 depicts an ABS view of another exemplary embodiment of a portion of a magnetic recording read transducer during fabrication.

A nonmagnetic layer may be provided, via step 172. The nonmagnetic layer provided in step 172 may be analogous to the nonmagnetic layer 204 depicted in FIG. 6. Referring back to FIGS. 13-17, a mask that exposes the region on which the first AFC shield is desired to be located is provided, via step 174. FIG. 14 depicts the transducer 270 after step 174 is performed. Thus, the underlayer(s) 272 and mask 274 are shown. The underlayer(s) 272 include the nonmagnetic layer provided in step 172. Other layers may also be present.

Figure 15:
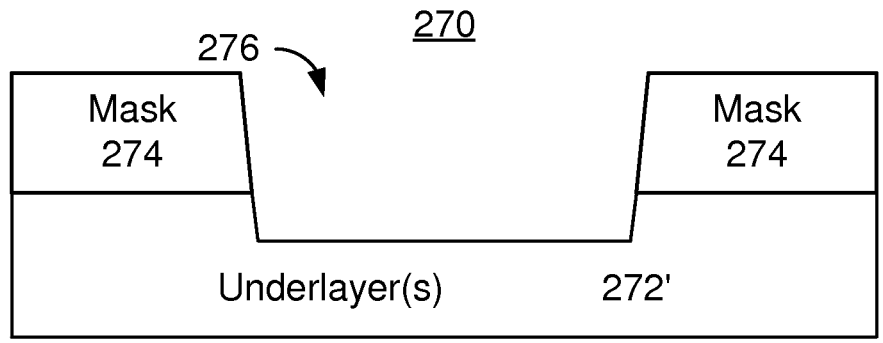

A trench is formed in the nonmagnetic layer, via step 176. Step 176 may include a mill, a reactive ion etch (RIE) of the region or other mechanism to form a trench in the nonmagnetic layer. FIG. 15 depicts the transducer 270 after step 176 is performed. Thus, a trench 276 has been provided.

Figure 16:
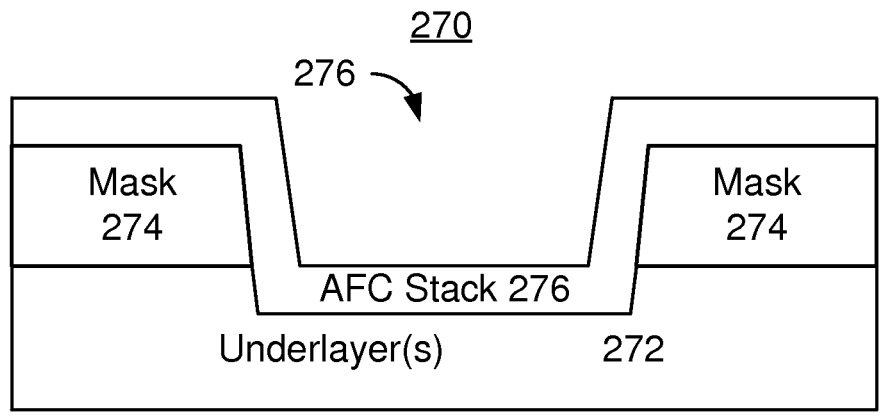

The first pinning layer is optionally provided, via step 178. Step 178 may thus be performed only if the pinning layer 218 is to be used. The first magnetic layer is deposited, via step 180. The first nonmagnetic spacer layer is provided, via step 182. The second magnetic layer is deposited, via step 184. Steps 180, 182 and 184 may include full-film depositing the layers. FIG. 16 depicts an ABS view of the transducer 270 after step 182 is performed. Thus, an AFC stack 276 is shown on underlayer(s) 272. The AFC stack 274 may include not only the first and second ferromagnetic layers separated by first nonmagnetic spacer layer but also the first pinning layer.

Figure 17:
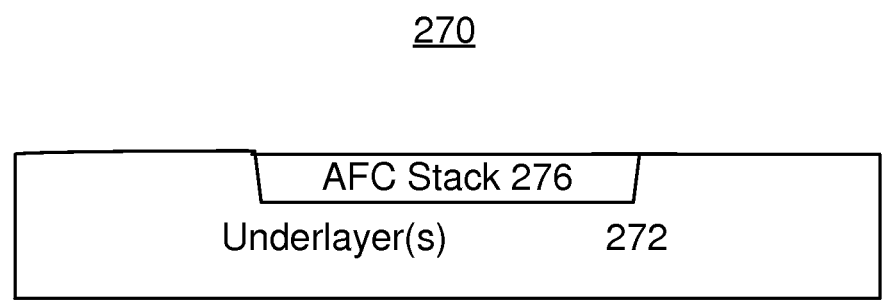

The mask 274 is lifted off, via step 186. Also in step 186, the transducer may be planarized. FIG. 17 depicts the transducer 250 after step 186 is performed. Thus, the AFC shield 274 remains. An anneal may then be performed, via step 188. For example, the anneal of step 188 may be performed at high temperatures in order to set the magnetization direction of the magnetic layers. Fabrication of other components of the transducer may then be completed.

The magnetic transducer 270 fabricated using the method 170 may have improved performance, particularly at higher recording densities and smaller track widths of the read sensor. Because of the symmetry between the mirrored AFC shields 276 and the remaining shield (not shown), there may be less magnetic noise. The configuration of the AFC shield 2276 and its mirror may also reduce disturbances due to internal write fields or external stray fields near the sensor. Consequently, performance of the magnetic transducer 270 may be improved.

We claim:

1. A magnetic read transducer having an air-bearing surface (ABS), comprising:
a first antiferromagnetically-coupled (AFC) shield, the first AFC shield including a first ferromagnetic layer, a second ferromagnetic layer and a first nonmagnetic spacer layer between the first ferromagnetic layer and the second ferromagnetic layer, the first ferromagnetic layer having a first saturation magnetization and a first thickness, the second ferromagnetic layer having a second saturation magnetization and a second thickness, wherein there is a first difference between the first ferromagnetic layer and the second ferromagnetic layer, the first difference including at least one of a difference between the first thickness and the second thickness or a difference between compositions of the first ferromagnetic layer and the second ferromagnetic layer;
a read sensor, the second ferromagnetic layer being between the read sensor and the first ferromagnetic layer; and
a second AFC shield, the second AFC shield including a third ferromagnetic layer, a fourth ferromagnetic layer and a second nonmagnetic spacer layer between the third ferromagnetic layer and the fourth ferromagnetic layer, the third ferromagnetic layer being between the read sensor and the fourth ferromagnetic layer, the third ferromagnetic layer having a third saturation magnetization and a third thickness, the fourth ferromagnetic layer having a fourth saturation magnetization and a fourth thickness, wherein there is a second difference between the third ferromagnetic layer and the fourth ferromagnetic layer that corresponds to the first difference such that the second AFC shield is a mirror image of the first AFC shield,
wherein the second saturation magnetization multiplied by the second thickness matches the third saturation magnetization multiplied by the third thickness to within twenty percent and the first saturation magnetization multiplied by the first thickness matches the fourth saturation magnetization multiplied by the fourth thickness to within twenty percent,
wherein the second thickness is different from the third thickness and the second ferromagnetic layer is made of different materials than materials in the third ferromagnetic layer, or the first thickness is different from the fourth thickness and the first ferromagnetic layer is made of different materials than materials in the fourth ferromagnetic layer.

2. The magnetic read transducer of claim 1 wherein the second ferromagnetic layer has a second ferromagnetic layer magnetic moment that is antiferromagnetically-aligned with a third ferromagnetic layer magnetic moment of the third ferromagnetic layer.

3. The magnetic read transducer of claim 1 wherein the second ferromagnetic layer has a second ferromagnetic layer magnetic moment that is aligned parallel with a third ferromagnetic layer magnetic moment of the third ferromagnetic layer.

4. The magnetic read transducer of claim 1 wherein the second AFC shield further includes
   a pinning layer magnetically-coupled with the fourth ferromagnetic layer.

5. The magnetic read transducer of claim 4 wherein the first AFC shield further includes
   an additional pinning layer magnetically-coupled with the first ferromagnetic layer.

6. The magnetic read transducer of claim 1 wherein the first AFC shield further includes
   a first CoFeB layer and the second AFC shield further includes
   a second CoFeB layer.

7. The magnetic read transducer of claim 1 further comprising
   a bottom shield, the first AFC shield residing on the bottom shield.

8. The magnetic read transducer of claim 7 further comprising
   a nonmagnetic layer on the bottom shield, the nonmagnetic layer being between the first AFC shield and the bottom shield.

9. The magnetic read transducer of claim 8 wherein the nonmagnetic layer is planarized.

10. The magnetic read transducer of claim 7 further comprising
    a top shield residing on the second AFC shield.

11. The magnetic read transducer of claim 10 further comprising
    an additional nonmagnetic layer on the second AFC shield, the additional nonmagnetic layer being between the second AFC shield and the top shield.

12. A method for providing a magnetic read transducer having an air-bearing surface (ABS), comprising:
    providing a bottom shield;
    providing a first nonmagnetic layer on the bottom shield;
    planarizing the first nonmagnetic layer;
    providing a first antiferromagnetically-coupled (AFC) shield on the first nonmagnetic layer, the first AFC shield including a first ferromagnetic layer, a second ferromagnetic layer and a first nonmagnetic spacer layer between the first ferromagnetic layer and the second ferromagnetic layer, the first ferromagnetic layer having a first magnetic moment and a first thickness, the second ferromagnetic layer having a second magnetic moment and a second thickness, wherein there is a first difference between the first ferromagnetic layer and the second ferromagnetic layer, the first difference including at least one of a difference between the first thickness and the second thickness or a difference between compositions of the first ferromagnetic layer and the second ferromagnetic layer;
    providing a read sensor, the second ferromagnetic layer being between the read sensor and the first ferromagnetic layer; and
    providing a second AFC shield, the second AFC shield including a third ferromagnetic layer, a fourth ferromagnetic layer and a second nonmagnetic spacer layer between the third ferromagnetic layer and the fourth ferromagnetic layer, the third ferromagnetic layer being between the read sensor and the fourth ferromagnetic layer, the third ferromagnetic layer having a third magnetic moment and a third thickness, the fourth ferromagnetic layer having a fourth magnetic moment and a fourth thickness, wherein there is a second difference between the third ferromagnetic layer and the fourth ferromagnetic layer that corresponds to the first difference such that the second AFC shield is a mirror image of the first AFC shield,
    wherein the first ferromagnetic layer has a first saturation magnetization, the second ferromagnetic layer has a second saturation magnetization, the third ferromagnetic layer has a third saturation magnetization, and the fourth ferromagnetic layer has a fourth saturation magnetization,
    wherein the second saturation magnetization multiplied by the second thickness matches the third saturation magnetization multiplied by the third thickness to within twenty percent and the first saturation magnetization multiplied by the first thickness matches the fourth saturation magnetization multiplied by the fourth thickness to within twenty percent,
    wherein the second thickness is different from the third thickness and the second ferromagnetic layer is made of different materials than materials in the third ferromagnetic layer, or the first thickness is different from the fourth thickness and the first ferromagnetic layer is made of different materials than materials in the fourth ferromagnetic layer;
    providing a second nonmagnetic layer on the second AFC shield; and
    providing a top shield residing on the second nonmagnetic layer.

13. The method of claim 12 wherein the step of providing the first AFC shield further includes:
    depositing at least a first layer for the first ferromagnetic layer on the first nonmagnetic layer;
    depositing a second layer for the first nonmagnetic spacer layer on the at least the first layer;
    depositing at least a third layer for the second ferromagnetic layer on the second layer;
    providing a mask covering a portion of the at least the third layer corresponding to the second ferromagnetic layer; and
    removing a portion of the at least the first layer, the second layer and the at least the third layer exposed by the mask, such that the first ferromagnetic layer, first nonmagnetic layer, and the second ferromagnetic layer of the first AFC shield remain.

14. The method of claim 12 wherein the step of providing the first AFC shield further includes:
    providing a mask exposing a portion of the first nonmagnetic layer corresponding to the first AFC shield;
    removing a portion of the first nonmagnetic layer exposed by the mask to form a shield trench;
    depositing at least a first layer for the first ferromagnetic layer, a portion of the at least the first layer residing in the shield trench corresponding to the first ferromagnetic layer;
    depositing a second layer for the first nonmagnetic spacer layer on the at least the first layer, a portion of the second layer residing in the shield trench corresponding to the first nonmagnetic spacer layer;
    depositing at least a third layer for the second ferromagnetic layer on the second layer, a portion of the at least the third layer residing in the shield trench corresponding to the second ferromagnetic layer;
    removing the mask such that the first ferromagnetic layer, the second ferromagnetic layer and the first nonmagnetic spacer layer remaining in the shield trench form the first AFC shield.

15. A data storage device comprising the magnetic read transducer of claim 1.

* * * * *